United States Patent [19]

Friedrich et al.

[11] Patent Number: 4,946,334

[45] Date of Patent: Aug. 7, 1990

[54] WORKING VEHICLE, ESPECIALLY A LOADER

[75] Inventors: Karl Friedrich, Sipplingen; Dieter-Heinz Maly, Überlingen, both of Fed. Rep. of Germany

[73] Assignee: Kramer-Werke GmbH, Überlingen Bodensee, Fed. Rep. of Germany

[21] Appl. No.: 321,935

[22] Filed: Mar. 10, 1989

[30] Foreign Application Priority Data

Mar. 12, 1988 [DE] Fed. Rep. of Germany ....... 3808312

[51] Int. Cl.$^5$ .............................................. B66F 9/00
[52] U.S. Cl. ...................................... 414/697; 414/722
[58] Field of Search .............. 414/697, 722, 723, 680, 414/685, 686, 718; 172/272–275; 180/6.48

[56] References Cited

U.S. PATENT DOCUMENTS

| | | | |
|---|---|---|---|
| 3,047,170 | 7/1962 | Hough et al. | 414/697 |
| 3,198,358 | 8/1965 | Gardner | 414/722 X |
| 3,648,871 | 3/1972 | Layton . | |
| 3,760,883 | 9/1973 | Birk | 172/273 |
| 3,935,953 | 2/1976 | Stedman | 414/697 |

FOREIGN PATENT DOCUMENTS

| | | |
|---|---|---|
| 1658038 | 11/1967 | Fed. Rep. of Germany . |
| 3200800 | 1/1982 | Fed. Rep. of Germany . |
| 1482635 | 4/1967 | France . |
| 607235 | 8/1960 | Italy ................................. 414/697 |
| 1522510 | 8/1978 | United Kingdom . |

Primary Examiner—Robert J. Spar
Assistant Examiner—Donald W. Underwood
Attorney, Agent, or Firm—Helfgott & Karas

[57] ABSTRACT

A vehicle-mounted loader has a loading apparatus disposed centrally at the front end of the vehicle frame and including a raising cylinder supported on the front end, a dumping beam and quick-change device. The quick-change device is pivotally connected by a dumping rod to the dumping beam which can be actuated by a dumping cylinder. To reduce tipping torque about a transverse axis of the vehicle, the vehicle end of the raising arm is accommodated in a channel-like, forwardly open recess in the front end of the frame. The dumping cylinder is also articulated to the front end of the frame. The raising arm is constructed as a narrow component so that when the arm together with the quick-change device is in a completely lowered position it will be accommodated between the front wheels of the vehicle while, as seen from the side, only the quick-change device will slightly downwardly project out of the space between the front wheels.

7 Claims, 2 Drawing Sheets

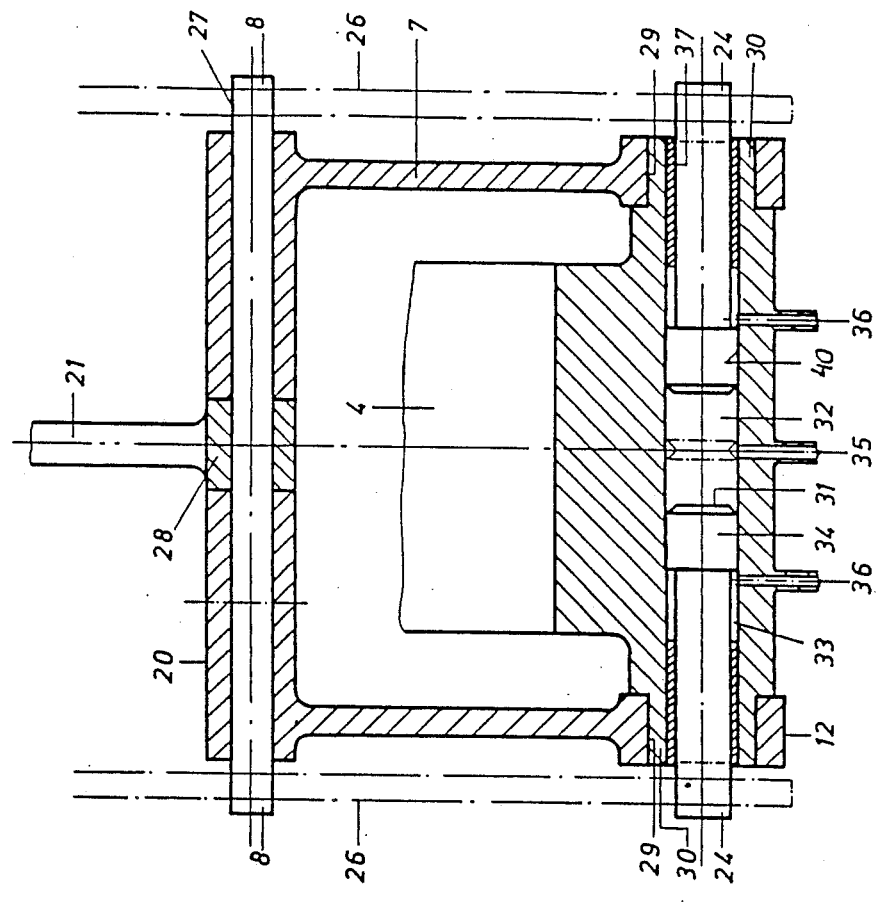
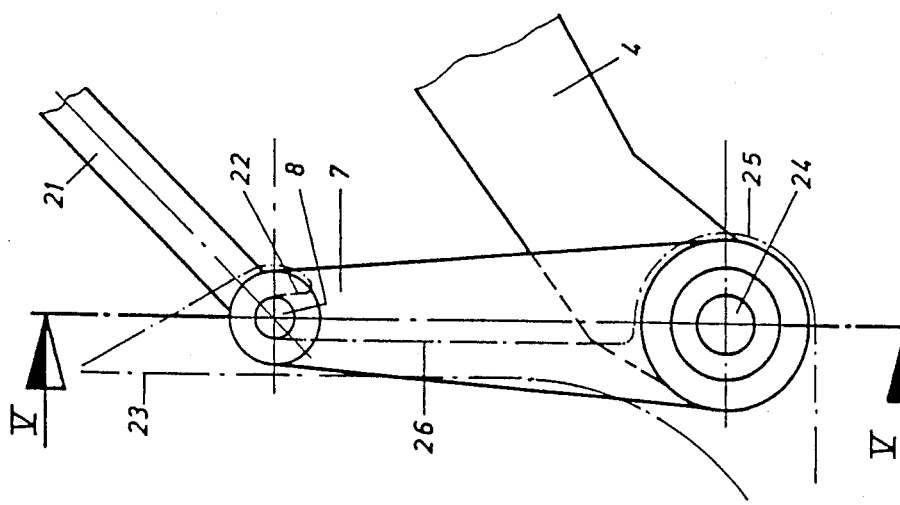

WORKING VEHICLE, ESPECIALLY A LOADER

BACKGROUND OF THE INVENTION

The invention relates to a working vehicle, especially a loader with loading apparatus disposed centrally on the front, on whose raising arm there is articulated a raising jack supported on the front end, a dumping beam and, at the front end, a quick-change device which is articulated through a dumping rod to the dumping beam actuated by a dumping cylinder.

Loaders of this type of construction have long been known. They have steerable rear wheels but nonsteerable front wheels so as to assure stability of stance when in operation.

SUMMARY OF THE INVENTION

It is an object of the present invention to provide a loading system in a working vehicle of this kind such that it will accept steerable front wheels with a steering deflection of over 40° without impairment of the stability of the vehicle against tipping about its transverse axis by external forces acting on the loading apparatus.

In accordance with the invention, this object is achieved on an apparatus of the kind described above by the fact that the vehicle end of the raising arm is within a channel-like recess open at the front end, that the dumping cylinder is articulated on the front end, and that the raising arm is constructed as a narrow component and, as seen in plan view, is situated, together with a quick-change device, between the front wheels when in its fully lowered position, such that, as seen in side elevation view, only the quick-change device projects slightly downwardly between the wheels.

Such a construction of the loader assures that the lever arm of the tipping torques occurring about the transverse axis of the vehicle is especially short; this is contributed to not only by the withdrawal of the raising arm into the space between the wheels but also by its deep articulation in a recess in the front end of the loader.

The raising arm is so configured, in accordance with the invention, that even in the case of front wheels with a great steering deflection it finds room even when it is fully lowered. In this position the loader shovel is situated directly in front of the front wheels, thereby improving stability against pitching and making it possible to use smaller balancing weights.

The low setting of the raising arm furthermore gives the driver an excellent view of the work area and a clear view when lifting.

To save space it is desirable, according to another embodiment of the invention, that the raising cylinder and dumping cylinder be articulated on the front end below the raising arm, and that the raising arm be a structural steel shape having projecting lateral flanges at the vehicle end, so that it protects both cylinders at the front. In this arrangement, the hydraulic cylinders are especially well protected against the material being loaded. The preferred structural steel shape is a box section to the sides of which the flanges are attached, or it is a steel channel; this protected arrangement of the hydraulic cylinders can be further improved if at least the dumping cylinder enters partially into the interior of the raising arm, where even both cylinders can be disposed for pivoting within planes situated closely together.

Also, for space-saving reasons, the quick-change device is of especially simple construction. It has on each connecting end two laterally projecting connecting pins, namely an upper pin for holding the shovel hooks, and a lower locking pin which can be axially extended and retracted hydraulically. The simplification in comparison with known quick-change devices consists in the fact that the locking pins are disposed each for axial displacement in a central bore in a lateral pivot pin of the raising arm, and that the pivot pins are pivotingly held in corresponding bushings of the quick-change device.

BRIEF DESCRIPTION OF THE DRAWINGS

An embodiment of the invention will be explained below with the aid of the drawing, wherein:

FIG. 4 is a side elevation of the quick-change device; and

FIG. 5 is a section along line V—V of FIG. 4.

DETAILED DESCRIPTION OF THE PREFERRED EMBODIMENTS

Figure 1:
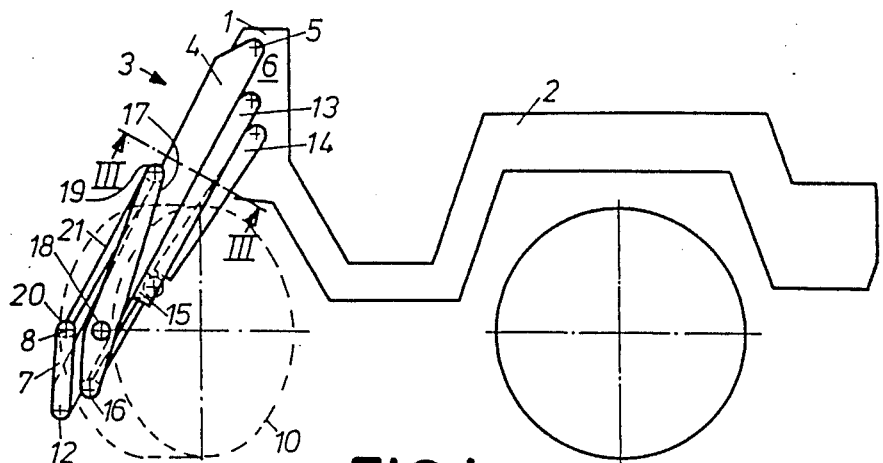
FIG. 1 is a side elevation of a loader.
Figure 2:
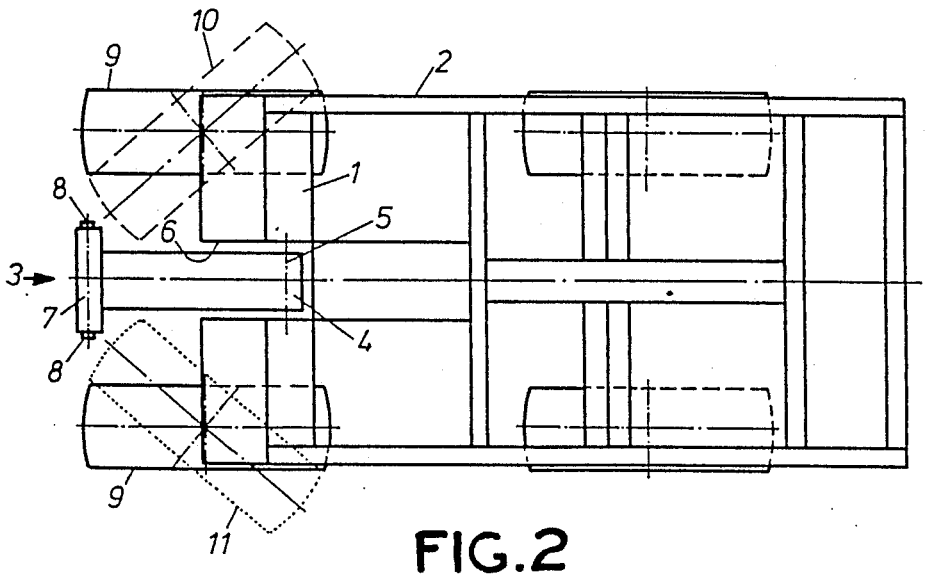
FIG. 2 is a top plan view of the loader of FIG. 1.

A loader represented in a diagrammatic side view in FIG. 1 has a loading apparatus 3 disposed centrally on the front end 1 of its frame 2. The loading apparatus includes a raising arm 4 which is articulated for pivoting about the horizontal axis 5 within a channel-like recess 6 in the front end. At the forward end of the raising arm 4 is a quick-change device 7 represented in plan in FIG. 2, having laterally projecting hanger pins 8 for the shovel hooks. In the plan view in FIG. 2, the front steering wheels 9 of the loader are shown in the straight-forward position. Furthermore, the right front wheel is indicated by a broken line 10 and the left front wheel with a dotted line 11, each in the fully deflected position. It can easily be seen that, in all of the wheel positions there is ample room for the raising arm 4 in the space between the wheels, while only the quick-change device 7, which is articulated to the front end of the raising arm 4, projects but slightly out of the space between the wheels at its bottom end 12. In FIG. 1, the right front wheel 9 is represented in the same position as indicated by the broken line 10 in FIG. 2.

Figure 3:
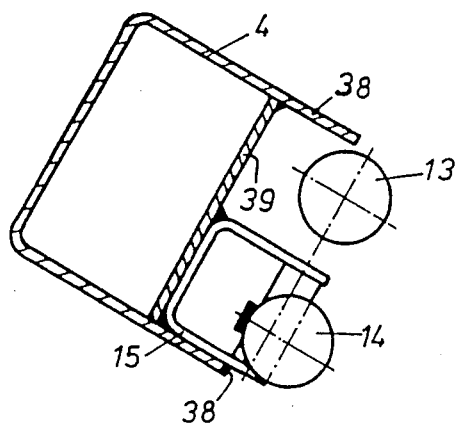
FIG. 3 is a cross section along line III—III through the loading apparatus of the loader.

The disposition of the dumping cylinder 13 and of the raising cylinder 14 for the operation of the loading apparatus can be seen in FIGS. 1 and 3. FIG. 1 shows that the two cylinders are articulated below the pivot axis 5 of the raising arm 4 within the recess 6 in the front end 1 of the loader. It can be seen from the section through the loading apparatus shown in FIG. 3 that the two cylinders can move in closely adjacent planes behind the raising arm 4; they fit partially between the lateral flanges 38 which project beyond the back wall 39 of the raising arm 4 which is of a box-like cross section. The lift cylinder 14, which is the lower one, is articulated at its bottom end on a shackle 15 on the rear wall 39 of the lift arm 4. The bottom end of the dumping cylinder 13 is articulated to the bottom end 16 of a dumping beam 17 which can pivot about a central shaft 18 journaled in the raising arm 4. The upper end of the dumping beam 17 is articulated through a dumping rod 21 to the upper end 20 of the quick-change device 7.

FIG. 4 shows a side view of the quick-change device 7 with the hanger pins 8 disposed at the top for engagement by the shovel hook 22 on the back of a loading shovel 23 indicated by a dash-dotted line. At the bottom end 12 the quick-change device has locking pins 24 which can be hydraulically driven in and out in the axial direction and which engage corresponding bores of eyes 25 provided on the bottom of the loading shovel. The eyes 25 and the shovel hook 22 are formed on opposite flanges 26 on the back of the loading shovel 23.

It can be seen in the cross section of FIG. 5 that the shovel hook hanger pins 8 are constituted by the extremities of a shaft 27 emerging at the opposite sides of the quick-change device 7. Shaft 27 is mounted so as to be nonrotatable and axially undisplaceable in a corresponding bore in the upper end of the quick-change device 7. In the middle of the shaft is a swivel bearing 28 of the bottom end of the dumping rod 21.

Journals 30 are formed laterally on the bottom end of the lift arm 4 and are engaged in corresponding bearings 29 in the quick-change device 7. The end section of the raising arm 4 has a central bore 40 for the locking pins 24 whose inner ends 31 terminate at a central pressure chamber 32 to which a hydraulic medium can be delivered. Two additional pressure chambers 33 are formed on the back of the piston portion 34 on the inner end of the locking pins 24. If the pressure chamber 32 is placed under pressure through a central pressure line 35, the two locking pins 24 are thrust outwardly; if the central chamber 32 is pressureless and the pressure medium is fed through the two outer pressure lines 36 into pressure chambers 33, both of the locking pins 24 will be retracted, thus releasing the eye 25 of the loading shovel 23. A sealing means 37 affixed to but releasable from the bearings, in whose bore the locking pin 24 of smaller diameter is guided, permits its easy installation in the cylinder bore 40.

We claim:

1. In a vehicle-mounted loader comprising a frame; wheels; and a loading apparatus disposed centrally at the front of said frame and including a raising arm, a lifting jack articulated on said raising arm and supported at the front end of said frame, a dumping beam, and a quick-change device connected to a front end of said raising arm and being articulated through a dumping rod to said dumping beam which is actuated by a dumping cylinder, the improvement comprising said frame being formed at said front end thereof with a channel-like recess open at a forward end thereof and accommodating a vehicle-facing end portion of said raising arm, said dumping cylinder being articulated to said front end of said frame, and said raising arm being a single element which has a sufficiently narrow width as seen in a plan view, so that said raising arm together with said quick-change device are situated between front wheels of a vehicle when said quick-change device is in a fully lowered position and only said quick-change device projects slightly downwardly out of a space between said front wheels as seen in an elevation view, whereby a steering deflection of over 40° of said front wheels can be obtained without impairing stability of the vehicle.

2. Loader in accordance with claim 1, wherein said recess is centrally positioned at said front end of said frame.

3. Loader in accordance with claim 1, wherein said lifting cylinder and said dumping cylinder are articulated to the front end of said frame underneath said raising arm, said raising arm having at a vehicle end lateral projecting flanges, so that said arm shields said lifting and dumping cylinders from the front.

4. Loader in accordance with claim 1, wherein at least said dumping cylinder is positioned in said loading apparatus so as to partially enter into an interior of said raising arm.

5. Loader in accordance with claim 1, wherein said lifting and dumping cylinders are pivotally arranged within planes positioned closely together.

6. Loader in accordance with claim 1, wherein said quick-change device includes at each side thereof two laterally projecting connecting pins for supporting loading shovels, said pins including an upper hanger pin for supporting shovel hooks and a lower locking pin which can be axially hydraulically extended and retracted relative to said raising arm.

7. Loader in accordance with claim 6, wherein said raising arm includes lateral journal pins each having a central bore, and said locking pins at the sides of said quick-change device are each axially displaceable in the central bore of a respective lateral journal pin of the raising arm, said journal pins being rotatably positioned in corresponding bushings of said quick-change device.

* * * * *